United States Patent [19]

du Chene et al.

[11] Patent Number: 4,760,549

[45] Date of Patent: Jul. 26, 1988

[54] IN LINE TESTING DEVICE FOR A CIRCUIT CALCULATING THE DISCRETE FOURIER TRANSFORM AND A CIRCUIT COMPRISING SUCH A DEVICE

[75] Inventors: Arnaud du Chene; Brigitte Delalande; Thierry Mariaux, all of Paris, France

[73] Assignee: Thomson-CSF, Paris, France

[21] Appl. No.: 791,130

[22] Filed: Oct. 24, 1985

[30] Foreign Application Priority Data

Nov. 6, 1984 [FR] France ................. 84 16877

[51] Int. Cl.$^4$ .............. G06F 7/34; G06F 15/35; G06F 11/00
[52] U.S. Cl. .................. 364/726; 364/737
[58] Field of Search ............. 364/725, 726, 736, 737

[56] References Cited

U.S. PATENT DOCUMENTS

| | | | |
|---|---|---|---|
| 3,884,546 | 5/1975 | Chu | 350/3.5 |
| 3,998,496 | 12/1976 | Bernab' et al. | 364/426 X |
| 4,158,888 | 6/1979 | Shapiro et al. | 364/726 |
| 4,334,273 | 6/1982 | Ikeda | 364/726 |
| 4,408,284 | 10/1983 | Kijesky et al. | 364/726 |
| 4,479,188 | 10/1984 | de Keijzer | 364/726 |
| 4,547,862 | 10/1985 | McIver et al. | 364/726 |

FOREIGN PATENT DOCUMENTS

| | | | |
|---|---|---|---|
| 0171305 | 2/1986 | European Pat. Off. | 364/726 |
| 2436034 | 2/1975 | Fed. Rep. of Germany | 350/3.5 |

OTHER PUBLICATIONS

A. Lord, "Signal Processing Using F.F.T. Techniques", New Electronics, vol. 16, No. 8, Apr. 1983, pp. 52–53.

Primary Examiner—Gary V. Harkcom
Assistant Examiner—Long Thanh Nguyen
Attorney, Agent, or Firm—Cushman, Darby & Cushman

[57] ABSTRACT

An in line testing device for a circuit calculating discrete Fourier transform as well as a circuit including such a device. The device has a processor for calculating the discrete Fourier transform and a processor effecting in line checking of the calculation of the discrete Fourier transform. The check uses Parseval's theorem:

$$\sum_{n=0}^{N-1} |x(n)|^2 = \frac{1}{N} \sum_{k=0}^{N-1} |X(k)|^2 \qquad (1)$$

9 Claims, 8 Drawing Sheets

FIG_1
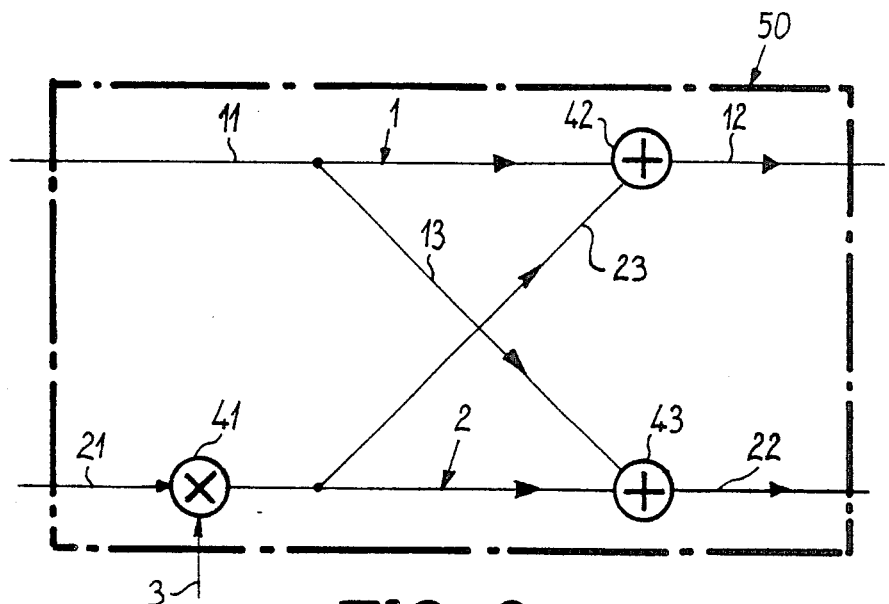
FIG_2
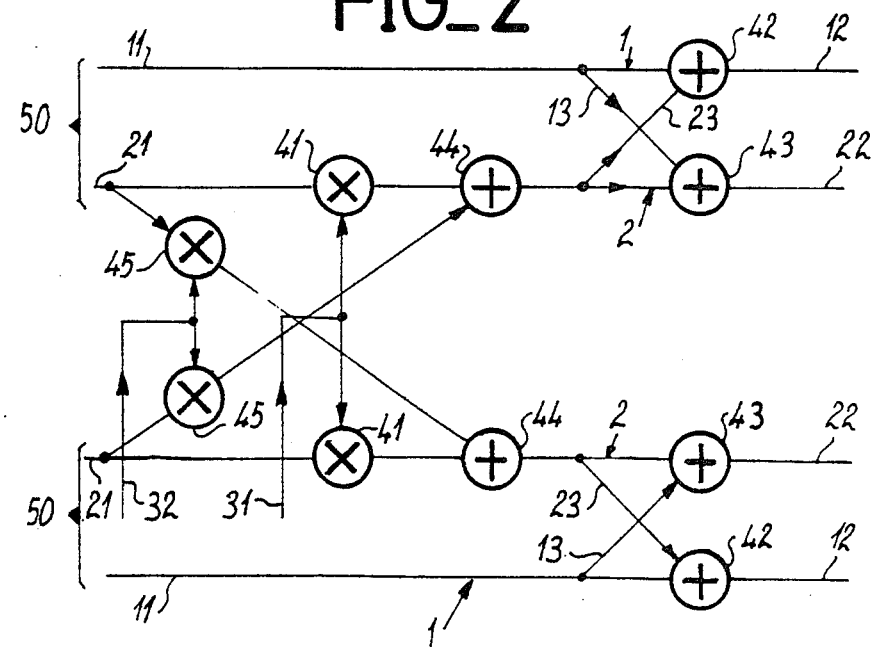

FIG_3
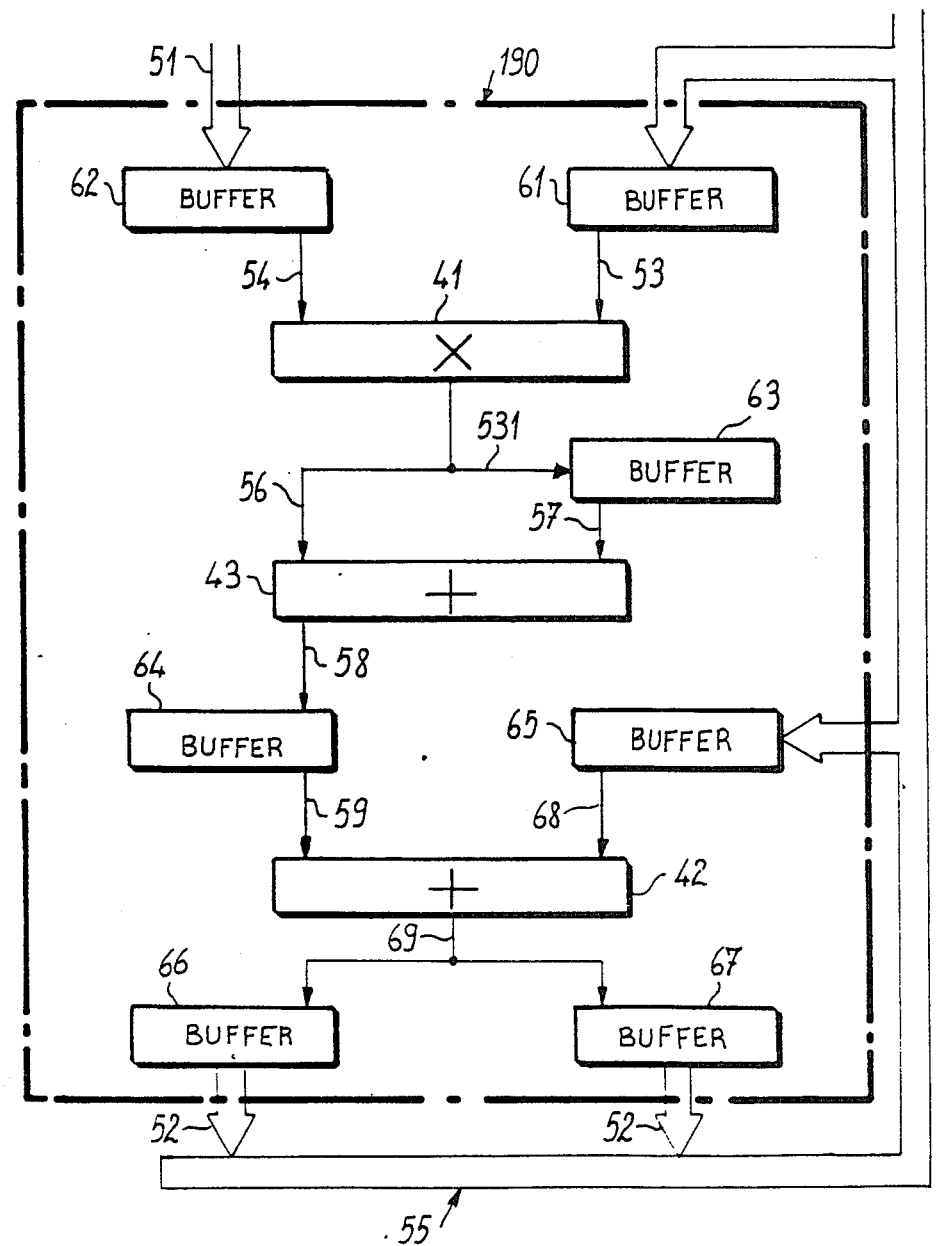

FIG_4
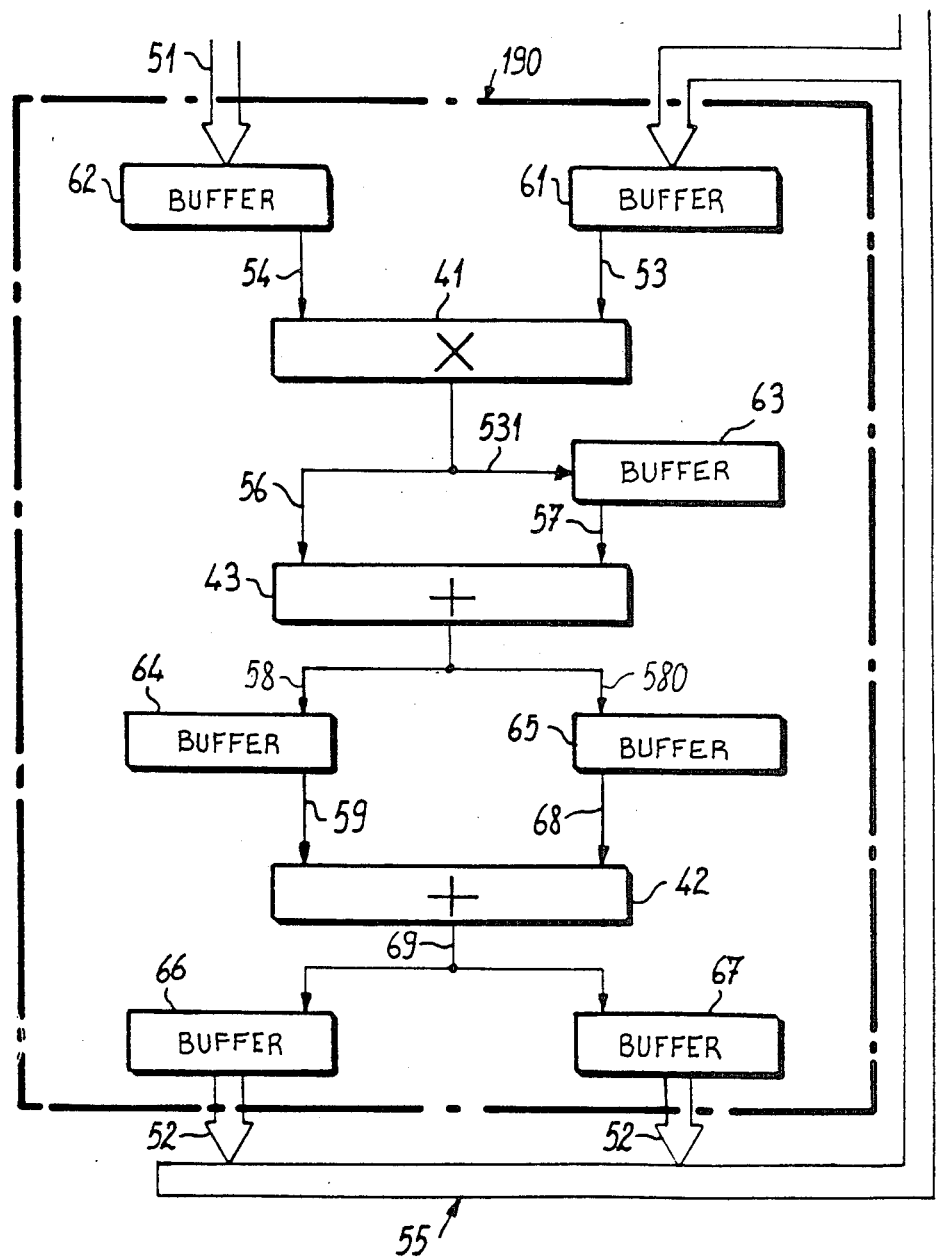

FIG_5
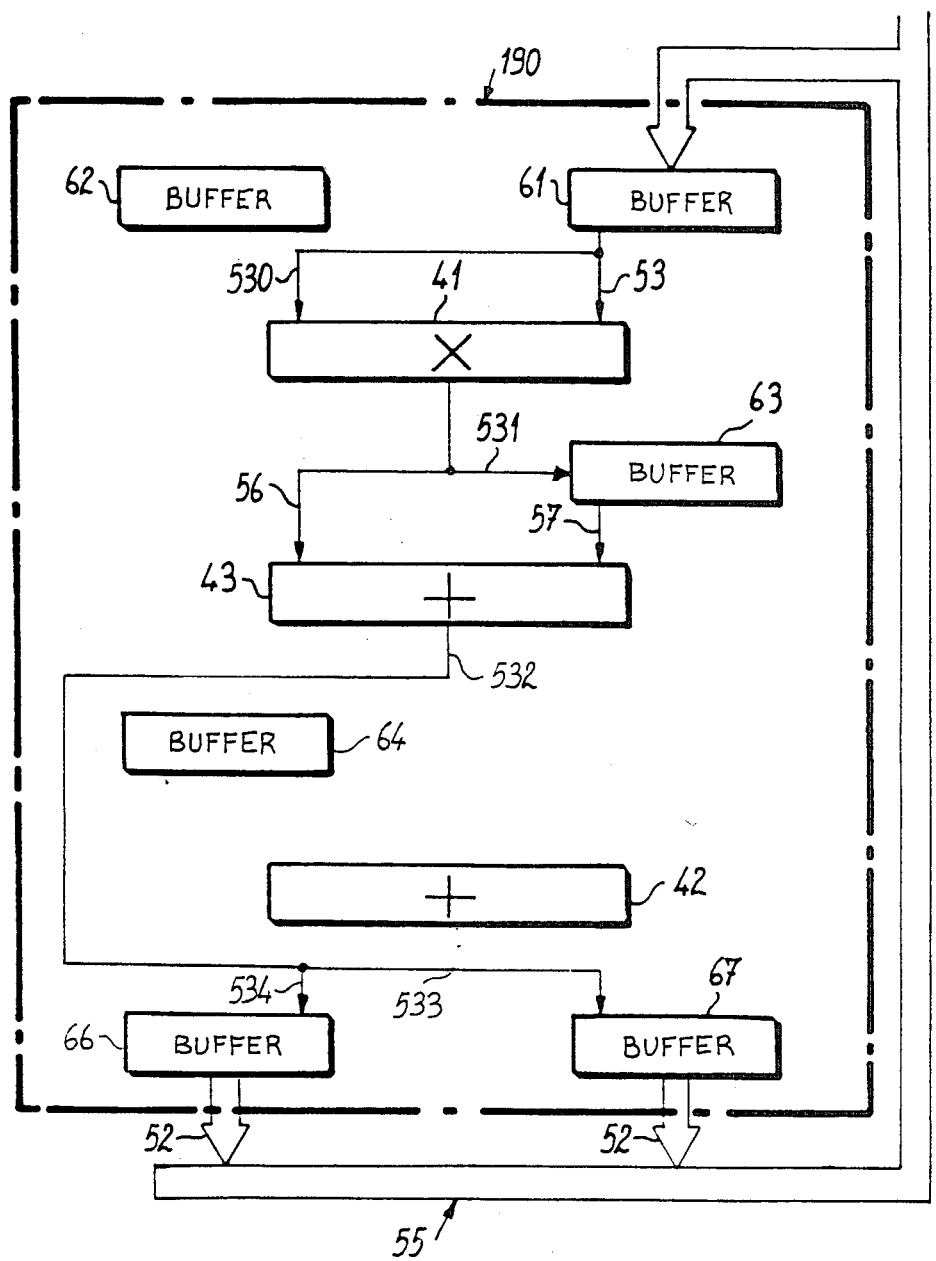

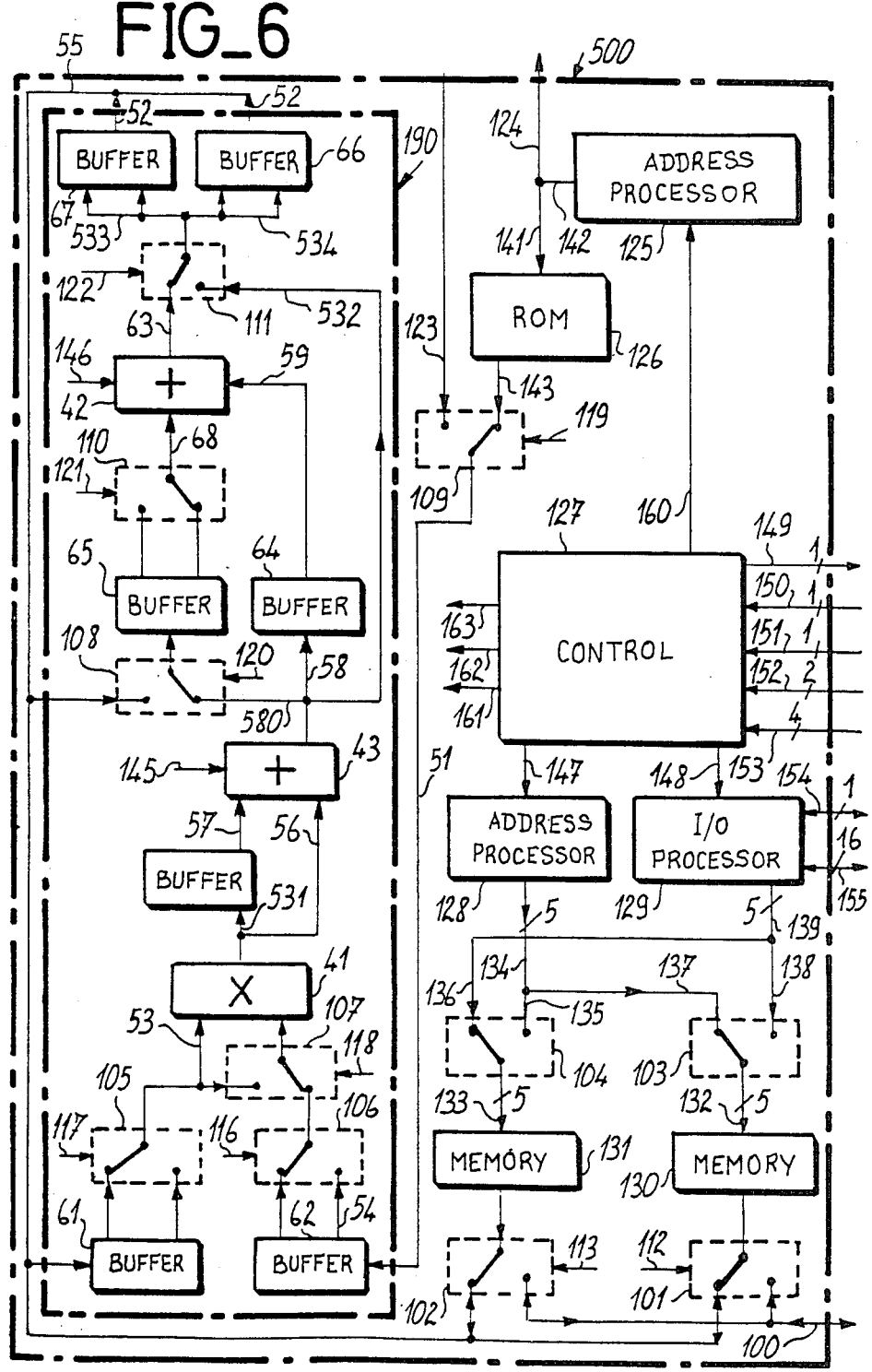
FIG_6

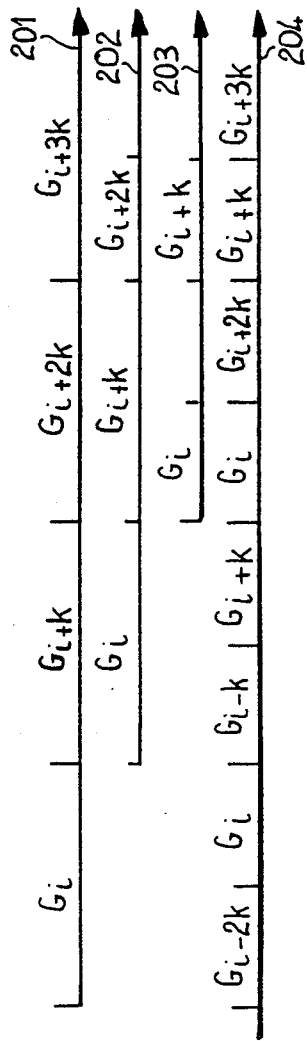
FIG_7
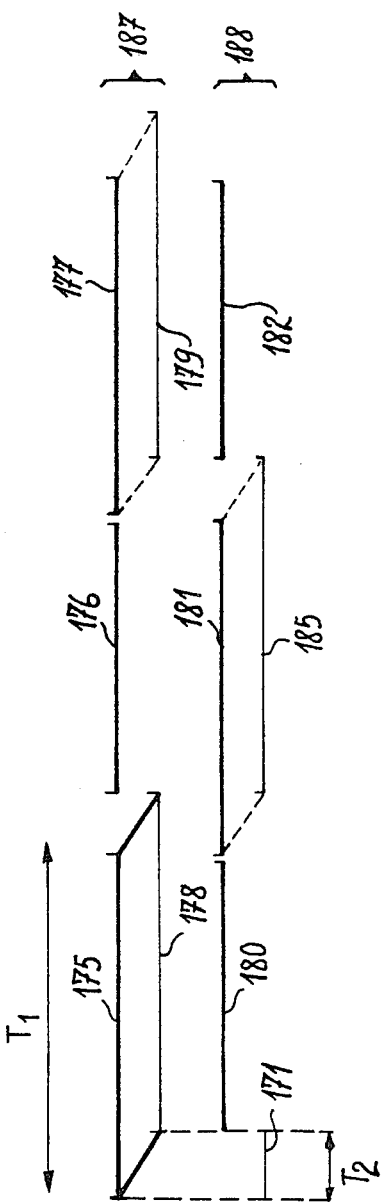
FIG_8

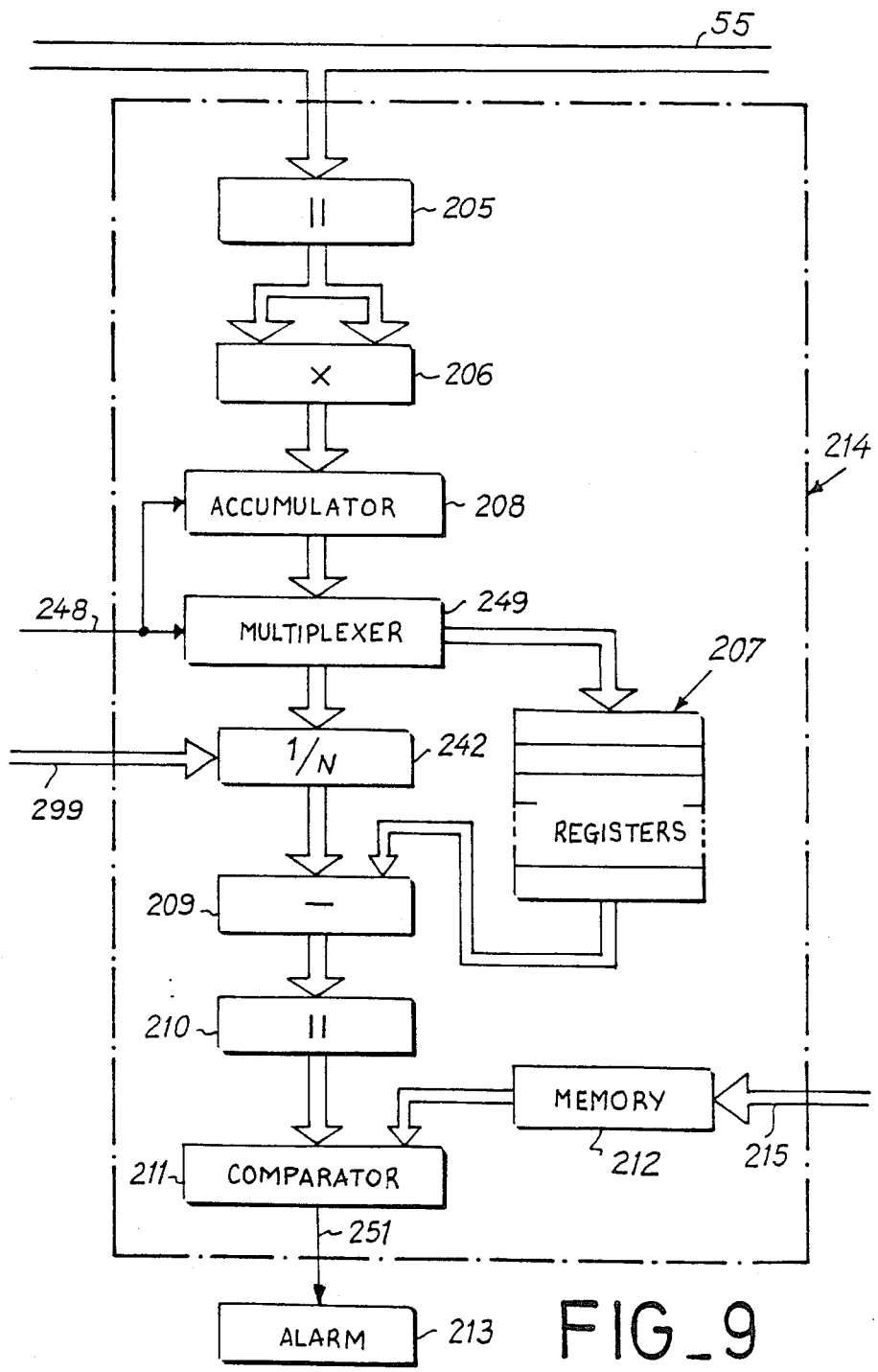
FIG_9

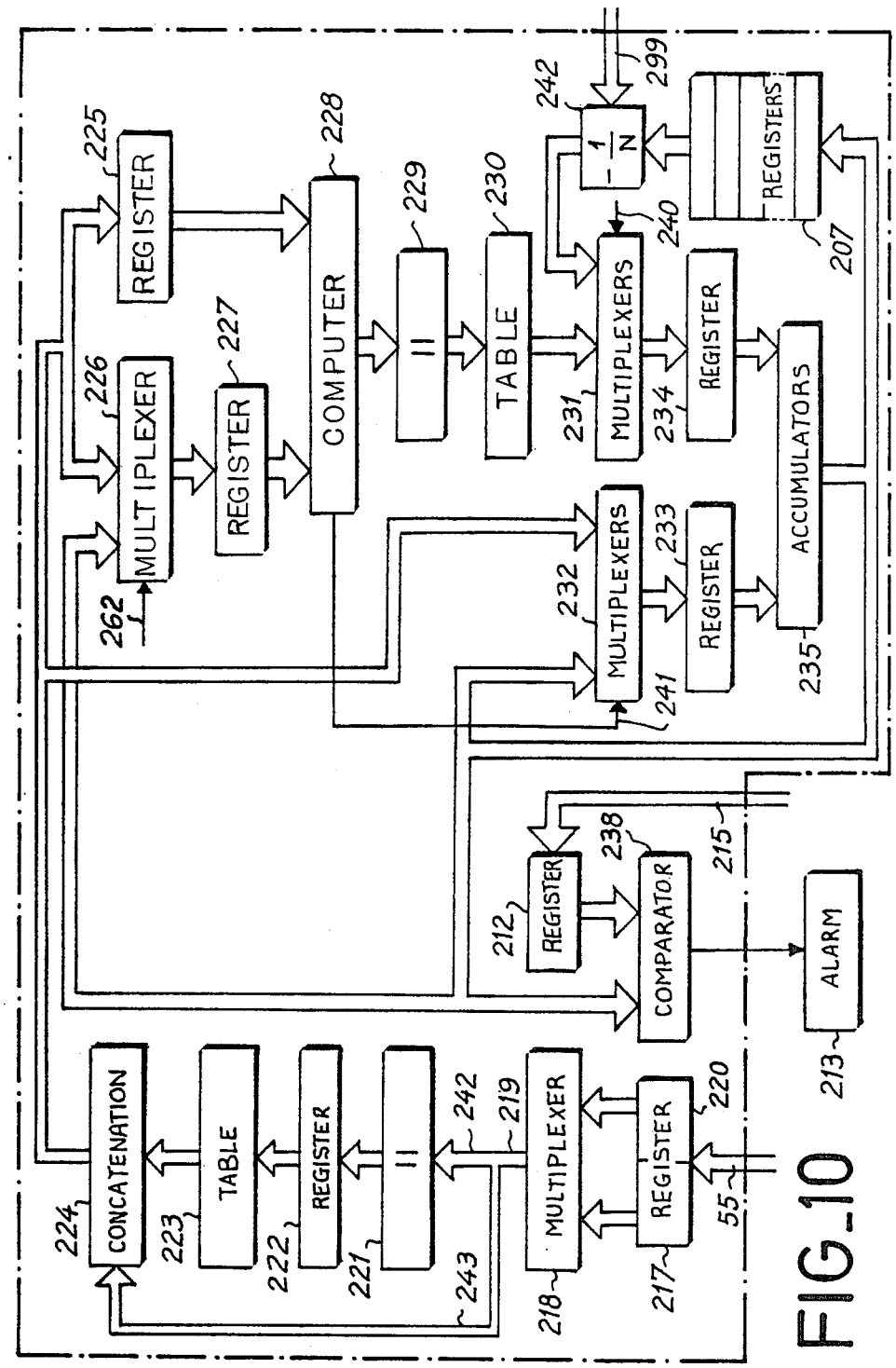
FIG_10

IN LINE TESTING DEVICE FOR A CIRCUIT CALCULATING THE DISCRETE FOURIER TRANSFORM AND A CIRCUIT COMPRISING SUCH A DEVICE

BACKGROUND OF THE INVENTION

The invention relates principally to in an in line testing device for a circuit calculating the discrete Fourier transform and a circuit comprising such a device. The Fourier transform is an extremely powerful mathematical tool used more particularly for calculating spectra.

The Fourier transform more especially allows the convolution product to be calculated. In fact, the Fourier transform of the convolution product of two functions is equal to the Fourier transform product of these two functions. Thus, at each point the convolution product of two functions is equal to the inverse Fourier transform of the product of the Fourier transforms of these two functions.

It is often advantageous to weight a function whose Fourier transform it is desired to calculate. The device of the present invention allows the weighting to be effected in a desired way, for example, before calculating the Fourier transform. For a discrete succession, the weighting is effected by multiplying the terms of the succession by weighting coefficients which are stored for example in a read only memory (ROM). Advantageously, the ROM contains several sets of coefficients so that the desired weighting can be chosen.

It is often indispensable to check the validity of the calculated results. One solution, for example, uses doubling the number of calculating circuits and associating therewith a comparator which only validates the calculation if the results calculated by the two circuits are identical. Such a step, however, proves very expensive. The device of the invention allows the result of calculating the Fourier transform to be checked for a predetermined error rate. For that, the device checks the result of calculating the Fourier transform by using Parseval's theorem. The result calculated by the operator is validated solely in the case of equality of the results. Advantageously, the erroneous result is replaced by the preceding result or the following result or is quite simply replaced by the linear interpolation of these two results.

SUMMARY OF THE INVENTION

The circuit of the present invention is connected to a circuit effecting, for a succession of numbers, the digital calculation called a discrete Fourier transform, or DFT in the rest of this patent. For each time, the values of DFT are substantially equal to the value of the Fourier transform.

Let f be a succession of numbers $f_n$, n being the rank of the number $f_n$ in the succession f.

The succession f is for example the succession of N digital values of a function which has been sampled.

$F_k$, DFT of $f_n$ is defined by:

$$F_k = \sum_{n=0}^{N-1} f_n W^{nk} \text{ with } W = e^{-j(2\pi/N)}$$

The device of the invention proposes breaking a complex calculation down into successions of simple calculations. For that, the device of the invention uses a butterfly structure illustrated in FIG. 1 and discussed later in this disclosure.

The DFT calculating algorithm is that of decimation in time:

If N is even, the succession f may be broken down into a succession g of the terms of f of even coefficient and a succession h of the terms of the succession f of uneven coefficients: For $0 \leq L \leq N/2 - 1$ $$g_L = f_{2L}$$

$$h_L = f_{2L+1}$$

Let $G_k$ and $H_k$ be the DFT respectively of $g_L$ and $h_L$.

$$G_k = \sum_{L=0}^{L=\frac{N}{2}-1} g_L (W^2)^{LK} \quad (1)$$

$$H_k = \sum_{L=0}^{L=\frac{N}{2}-1} h_L (W^2)^{Lk}$$

Then $$F_k = \begin{cases} G_k + W^K H_k & \text{for } 0 \leq k \leq \frac{N}{2} - 1 \\ G_{K-N/2} + W^k H_{k-N/2} & \text{for } \frac{N}{2} \leq K \leq N - 1 \end{cases}$$

Particularly for two indices whose difference is equal to N/2, we have:

$$W^{m+N/2} = -W^m$$

$$F_m = G_m + W^m H_m$$

and $$F_{m+\frac{N}{2}} = G_m + W^{m+\frac{N}{2}} H_m = G_m - W^m H_m$$

BRIEF DESCRIPTION OF THE DRAWINGS

The invention will be better understood from the following description and accompanying Figures given solely by way of non limitative examples in which:

FIG. 1 illustrates a calculating cycle called DFT butterfly for real numbers;

FIG. 2 illustrates a DFT butterfly for complex numbers;

FIGS. 3, 4 and 5 illustrate the data paths;

FIG. 6 illustrates a processing circuit that can be used according to the present invention;

FIGS. 7 and 8 illustrate the evolution in time of the functions of the components of the circuit of the invention; and FIGS. 9 and 10 illustrate two embodiments of the device of the invention.

DESCRIPTION OF THE PREFERRED EMBODIMENTS

In FIGS. 1 to 10 the same references designate the same elements.

In FIGS. 1 to 10 the direction of the data flows is shown by arrows.

FIG. 1 shows a simplified diagram of a DFT butterfly 50 using the algorithm of decimation in time. Butterfly 50 comprises a first line 1, with an input 11 and an output 12 and a second line 2 with an input 21 and an output 22. The line 1 comprises an adder 42. Line 2 comprises a multiplier 41 followed by an adder 43. Inputs of multiplier 41 are connected to the input 21 of line 2 and to a line 3. The inputs to adder 42 are connected to line 1 on the one hand and to line 2 at the level of the output of multiplier 41 by a line 23 on the other. The inputs to adder 43 are connected to line 2 at the level of the output of multiplier 41 on the one hand and to line 1 upstream of adder 42 by a line 13 on the other.

Butterfly 50 illustrated in FIG. 1 is particularly well adapted for the in time decimation calculation of terms of the DFT of successions of real numbers. Decimation in time implies that the terms of the successions g and h are present at the inputs 11 and 21 of butterfly 50. On the other hand, the outputs 12 and 22 of butterfly 50 include the ordered terms of the succession F. The following table gives the correspondance of the input and output indices for a DFT of 8 terms. That of the indices is related by the so called "bit reverse" relation for the most significant bits and the least significant bits are permuted in the binary writing of these indices.

TABLE I

| Input index | | Output Index | |
|---|---|---|---|
| Decimal | Binary | Decimal | Binary |
| 0 | 000 | 000 | 0 |
| 4 | 100 | 001 | 1 |
| 2 | 010 | 010 | 2 |
| 6 | 110 | 011 | 3 |
| 1 | 001 | 100 | 4 |
| 5 | 101 | 101 | 5 |
| 3 | 011 | 110 | 6 |
| 7 | 111 | 111 | 7 |

In FIG. 2, an assembly of two butterflies 50 is shown, capable of effecting the DFT calculation on successions of complex numbers. Each of butterflies 50 comprises an adder 44, one of whose inputs is connected to the output of the multipliers 40. The other input of said adders 44 is connected via multipliers 45 to the inputs 21 of the complementary butterflies. On the other hand, the inputs of multipliers 45 are connected to a line 32. The inputs of multipliers 41 are connected to a line 31. Lines 31 and 32 correspond to line 3 of FIG. 1.

In FIG. 3 can be seen the data path for calculating the DFT in one example of a processor according to the invention. Device 190 of FIGS. 3, 4 and 5 comprises the multiplier 41, the adders 42 and 43 as well as buffer memories 61 to 67. The buffer memories 61 to 67 provide the delay by a clock cycle required for synchronizing the pipe line structure of the processor of the invention as well as resynchronization with respect to the clock pulses. A data bus 55 connects device 190 of FIGS. 3, 4 and 5 to a memory not shown. The input of buffer memory 61 is connected to bus 55. The input of buffer memory 62 is connected by a bus 51 to a memory not shown storing the coefficient of the DFT. The outputs of buffer memories 61 and 62 are connected to the inputs of multiplier 41 respectively by lines 53 and 54. The output of multiplier 41 is connected on the one hand by line 53 to buffer memory 63 and on the other by a line 56 to an input of adder 43. The output of buffer memory 63 is connected to the other input of adder 43 by a line 57. The output of adder 43 is connected to the input of buffer memory 64 by a line 58. The output of buffer memory 64 is connected to an input of adder 42 by a line 59. The input of buffer memory 65 is connected to bus 55. The output of buffer memory 65 is connected to the other input of adder 42 by a line 68. The output of adder 42 is connected to the inputs of buffer memories 66 and 67 by a line 69. The outputs 52 from buffer memories 66 and 67 are connected to bus 55.

In FIG. 4 can be seen the data path for calculating the weighting in one example of a processor according to the invention. The input of buffer memory 61 is connected to bus 55. The input of the buffer memory 62 is connected by a bus 51 to a memory not shown storing the coefficients of the DFT. The outputs of buffer memories 61 and 62 are connected to the inputs of multiplier 41 respectively by lines 53 and 54. The output of multiplier 41 is connected on the one hand through a line 531 to a buffer memory 63 and on the other through line 56 to an input of adder 43. The output of buffer memory 63 is connected to the other input of adder 43 by line 57. The output of adder 43 is connected on the one hand to the input of buffer memory 65 by line 580 and on the other to the input of buffer memory 64 by a line 58. The output of buffer memory 65 is connected to an input of adder 42 by a line 68. The output of buffer memory 64 is connected to the other input of adder 42 by a line 59. The output of adder 42 is connected to the input of buffer memories 66 and 67 by a line 69. The outputs 52 of buffer memories 66 and 67 are connected to bus 55.

In FIG. 5 can be seen the data path for calculating the modulus of one example of a processor 190 in accordance with the invention. The buffer memories 62 and 64 as well as adder 42 of device 190 are not connected for calculating the modulus. The input of buffer memory 61 is connected to bus 55. The output from buffer memory 61 is connected to a first input of multiplier 41 by a line 53 and to a second input of multiplier 41 by a line 530. The output of multiplier 41 is connected on the one hand to the input of buffer memory 63 by a line 531 and on the other to an input of adder 43 by a line 56. The output of buffer memory 63 is connected to the other input of adder 43 by a line 57. The output of adder 43 is connected to the inputs of buffer memories 66 and 67 respectively by lines 534 and 533. The outputs 52 of buffer memories 66 and 67 are connected to bus 55.

In FIG. 6 can be seen a particularly well performing example of a processor 500 for calculating the DFT in accordance with the invention. Processor 500 allows the calculation of the DFT, the weighting followed by calculation of the DFT or calculation of the moduli to be chosen. It will be obvious for a man skilled in the art, following the teaching contained in this patent, to construct a processor executing first of all the correlations, the DFT followed by a weighting calculation. Processor 500 comprises the device 190 of FIGS. 3, 4, and 5, two random access memories (RAM) 130 and 131, an input-output processor 129, a processor 128 for calculating the addresses of memories 130, 131, a coefficient memory 126 associated with an address processor 125 as well as a logic circuit 121 controlling processor 500. The presence of the memories internal to processor 500 as well as their address and input-output processor allows the processing speed of the processor to be increased. The desired data paths in processor 500 are chosen through switches 101, 102, 103, 104, 105, 106, 107, 108, 109, 110 and 111 controlled respectively by the signals 112, 113, 114, 115, 116, 117, 118, 119, 120, 121 and 122. The signals controlling the switches are emitted by control unit 127 over line 161.

Device 190, and switches 105 and 106 allow the outputs of buffer memories 61 and 62 to be chosen. The output of switch 106 is connected to switch 107 for choosing at one of the inputs of multiplier 41 between the output of memory 62 and that of memory 61. Switch 108 allows the input of buffer memory 65 to be connected either to bus 55 or to the output of adder 43. Switch 110 allows one of the two outputs of buffer memory 65 to be chosen. With switch 111, the information present at the output of adder 42 can be fed to the buffer memory 66 or 67.

In the example shown in FIG. 6, memories 130 and 131 are of a reduced size. Thus, a data bus 100 connects them to an external memory not shown. In this latter memory is stored the succession whose DFT it is desired to calculate. Switches 101 and 102 allow writing of data from bus 100 or reading of data to be chosen and dispatched over bus 55 of memories respectively 130 and 131. Switch 101 receives a control signal 112 and switch 102 a control signal 113. Memories 130 and 131 comprise respectively an address bus 132 and 133. In the embodiment illustrated in FIG. 6, the applicant has used address buses of 5 bits corresponding to the capacity of memories 130 and 131. The address buses 132 and 133 are connected to the input-output processor 129 in the writing mode or to the address processor 128 in the reading mode. The selection is operated by memories 130 and 131 respectively by switches 103 and 104 which receive respectively the control signals 114 and 115. The input-output processor 129 is connected to the switch first of all by a line 139 itself connected to switch 103 by a line 138 and to switch 104 by a line 136. The address processor 128 is connected to switches 103 and 104 respectively by lines 137 and 135 connected to line 134. The input-output processor 129 is connected by line 155 to the external memory not shown, to which it sends, for example over 16 bits, the address to be read in said external memory.

In the reading mode, memories 130 and 131 are connected to the data bus 55 so as to supply to device 190 the data to be processed.

Memory 126 contains the coefficients W of the DFT. It is connected to bus 51 through line 143 and switch 109. The address processor 125 of memory 126 is connected to its address bus 141 by a line 142. Memory 126 is for example a read only memory (ROM) or programmable read only memory (PROM). Advantageously, the device of the invention allows the coefficients W of the DFT to be changed. The additional sets of coefficients are stored in a memory external to processor 500. The address processor 125 allows this memory to be addressed over line 142 and bus 124. The data of this memory are present on bus 123 which is connected to bus 51 through switch 109. The input-output processor 129 is connected to an external input-output clock. All the clocks internal to the processor 500 are synchronized by the control device 127 by means of line 162. Depending on the type of calculation to be executed, adders 43 and 42 must carry out additions or subtractions. Switching between these two functions is provided by signals 145 and 146 received from the control device 127 over line 126. The number N of the terms of the succession f whose DFT it is desired to calculate is given by line 153. The order to effect weighting is given to the control device 127 by line 152, for example over one bit. The order to calculate the modulus is given to the control device 127 by line 151, for example over one bit. The order to begin calculation is given to the control device 127 by line 150, for example over a line transmitting one bit. The end of calculation is signalled by a control device 127 over line 149, for example over one bit. So as not to overload the Figure, lines 161, 162 and 163 have not been shown.

Memory 126 comprises the coefficients w of the DFT which are for example the Nth roots of unity. In fact, for all the calculations it is the coefficients belonging to the interval $[0, \pi]$ which are required. In a variant, memory 126 only contains the coefficients belonging to the interval $[0, \pi/4]$; the other coefficients being derived by conventional trigonometric rules. Memory 126 contains the coefficient of the largest sized DFT it is desired to calculate, for example 4096; the coefficient of a smaller sized DFT forms a sub assembly of the coefficients of the largest sized DFT.

In one example, multiplier 41 is a multiplier operating over fixed format data for example of 16 bits comprising 8 stages.

In the second example ensuring the multiplication of numbers in a floating point format, the multiplier comprises a circuit for processing the exponent supplying the exponent of the result.

In a third example, multiplier 41 comprises a device for giving the respective weight to the bits in the case where the format is not normalized.

Adders 43 and 42 process floating point format operands with 6 exponent bits and 18 mantissa bits. Advantageously, the adders comprise three pipe line stages comprising a denormalization stage, an adder stage and a renormalization stage.

As is shown by formula 1, calculation of a DFT using the device of the invention consists in subdividing into independent groups of reduced size while still executing the DFT butterflies of FIG. 1 or 2. The number of these butterflies in a group is therefore fixed by the size of the input data table. For example, for a DFT of 32 terms two steps are executed: a first step with four groups of 8 terms and a second with 8 groups of four terms. Thus, the four data tables of the 8 terms then of the 8 data tables of four terms are successively transferred one by one into memories 130 and 131. Once the calculation has been worked out, the resulting tables are transferred into the external memory not shown at the same addresses as the input tables. It is then said that the calculation takes place "in situ". The internal calculating memory is divided into two blocks 130 and 131 playing alternately the role of input-output memories and that of the calculation memory.

Advantageously, bus 100 has a capacity allowing access of complex data. For example, from the elementary operation requiring four real multiplications and six real additions the memory, for example 130, will supply a device 190 with complex data and will also receive two complex data, the coefficients coming for example from memory 126. The following tables give the breakdowns for calculating the DFTs between 8 terms and 32,768 terms.

TABLE II

| N | Group | Number of Steps |
|---|---|---|
| 8 | 8 | 1 |
| 16 | 16 | 1 |
| 32 | 32 | 1 |
| 64 | 8 × 8 | 2 |
| 128 | 8 × 16 | 2 |
| 256 | 16 × 16 | 2 |
| 512 | 16 × 32 | 2 |
| 1024 | 32 × 32 | 2 |
| 2048 | 8 × 16 × 16 | 3 |
| 4096 | 16 × 16 × 16 | 3 |
| 8192 | 16 × 16 × 32 | 3 |

TABLE II-continued

| N | Group | Number of Steps |
|---|---|---|
| 16384 | 16 × 32 × 32 | 3 |
| 32768 | 32 × 32 × 32 | 3 |

The memory, for example 130, therefore stores either:
four tables of eight terms;
two tables of sixteen terms; or
a table of thirty two terms.

In the general case, the external memory not shown contains R tables of N terms. At the end of calculating a DFT of N terms, the processor 129 passes to the next table.

FIG. 7 illustrates the address sequences required for the different steps of DFT processing by processor 500. It can be seen in Table II that a DFT of N terms may be broken down for example into three steps comprising groups of N1, N2, N3 terms such that $N = N_1 \times N_2 \times N_3$. In one embodiment, an address sequence $G_1$ comprises the juxtaposition of three numbers C1, C2 and C3 of length respectively $Log_2 N_1$, $Log_2 N_2$, $Log_2 N_3$. Processor 129 supplies to the external memory the address of the input data of the group to be executed. For calculating the group of size $N_1$, C1 and C2 are varied, while C3 remains constant. To calculate the group of size $N_2$, C2 and C1 are varied while C3 remains constant. To calculate the group of size $N_3$, C3 and C1 are varied with C2 remaining constant.

An example of an address supplied by a processor 129 to the external memory of size $N_1$ is given by the table III.

TABLE III

| $C_1$ | | | $C_2$ | | | $C_3$ | | |
|---|---|---|---|---|---|---|---|---|
| $2^8$ | $2^7$ | $2^6$ | $2^5$ | $2^4$ | $2^3$ | $2^2$ | $2^1$ | $2^0$ |
| 256 | 128 | 64 | 32 | 16 | 8 | 4 | 2 | 1 |
| 0 | 0 | 0 | 0 | 1 | 1 | 0 | 1 | 0 |
| 0 | 0 | 1 | 0 | 1 | 1 | 0 | 1 | 0 |
| 0 | 1 | 0 | 0 | 1 | 1 | 0 | 1 | 0 |
| 0 | 1 | 1 | 0 | 1 | 1 | 0 | 1 | 0 |
| 1 | 0 | 0 | 0 | 1 | 1 | 0 | 1 | 0 |
| 1 | 0 | 1 | 0 | 1 | 1 | 0 | 1 | 0 |
| 1 | 1 | 0 | 0 | 1 | 1 | 0 | 1 | 0 |
| 1 | 1 | 1 | 0 | 1 | 1 | 0 | 1 | 0 |

Since the calculation is executed "in situ" the processor 129 therefore supplies the output addresses, these addresses are however shifted in time with respect to the input addresses.

TABLE IV

| Input Succession Stage | Inputs-Outputs Implantation | Internal memory | | | | | |
|---|---|---|---|---|---|---|---|
| | | 1st Stage Succession | | 2nd Stage Succession | | 3rd Stage Succession | |
| 0 | 0 | 0 | 000 | 0 | 000 | 0 | 000 |
| 1024 | 1 | 1 | 001 | 2 | 010 | 4 | 100 |
| 512 | 2 | 2 | 010 | 4 | 100 | 1 | 001 |
| 1536 | 3 | 3 | 011 | 6 | 110 | 5 | 101 |
| 256 | 4 | 4 | 100 | 1 | 001 | 2 | 010 |
| 1280 | 5 | 5 | 101 | 3 | 011 | 6 | 110 |
| 768 | 6 | 6 | 110 | 5 | 101 | 3 | 011 |
| 1792 | 7 | 7 | 111 | 7 | 111 | 7 | 111 |

In the example shown in FIG. 6, the weighting coefficients are contained in a memory external to processor 500. The address processor 125 calculates these coefficients and transmits them over line 142 to bus 124. The coefficients obtained are fed into the external memory not shown by the data bus 123 connected to bus 151.

Since each term whose DFT it is desired to calculate must be multiplied by a coefficient of the same index in one embodiment, calculation of the coefficients is provided by a binary counter. The coefficients are sequentially present on bus 123.

In another embodiment, the weighting coefficients are symmetrical with respect to the terms of index N/2. In this case, it is therefore possible that memory 126 does not contain N/2 first coefficients of the weighting law. In this case, a device transforming the address bits from the coefficient of rank N/2 is associated with the address bus 141 of memory 126.

In what follows one example of addressing organization of memory 126 by the processor 125 will be illustrated, it of course being understood that other types of addressing organization come within the scope of the present invention.

For example memory 126 may contain, arranged sequentially following each other, all the successions of coefficients required for effecting the desired Fourier transform calculations. In this case, the address processor 125 will comprise a binary counter which will add at each clock cycle a bit to the address of the beginning of the sequence.

Advantageously the size of memory 126 is limited by storing the sequences of coefficients required for DFT calculation only once and addressing them as many times as required for effecting a calculation. In this case, the address comprises two parts, a first part called hereafter basic sequence, depending solely on the size of the calculated DFT group and a second part called hereafter index succession comprising the physical address of the coefficient inside memory 126. One example of basic sequence addressing is given by Tables V, VI and VII. Table V corresponds to a table calculating eight terms, Table VI to a table for calculating sixteen terms and Table VII to a table for calculating thirty two terms. In one embodiment, the index is obtained by causing a binary mask to correspond to each step and by multiplying bit by bit, for bits of the same weight, the value of the mask by the value of the binary counter. One example of such a basic sequence for a size $N_1 = 16$ of the DFT table is given by Table VIII.

TABLE V

| stage | Butterfly | | |
|---|---|---|---|
| | 0 | 1 | 2 |
| 0 | 0 | 0 | 0 |
| 1 | 0 | 0 | N/8 |
| 2 | 0 | N/4 | 2N/8 |
| 3 | 0 | N/4 | 3N/8 |

$N_{i=8}$

TABLE VI

| stage | Butterfly | | | |
|---|---|---|---|---|
| | 0 | 1 | 2 | 3 |
| 0 | 0 | 0 | 0 | 0 |
| 1 | 0 | 0 | 0 | N/16 |
| 2 | 0 | 0 | N/8 | 2N/16 |
| 3 | 0 | 0 | N/8 | 3N/16 |
| 4 | 0 | N/4 | 2N/8 | 4N/16 |
| 5 | 0 | N/4 | 2N/8 | 5N/16 |
| 6 | 0 | N/4 | 3N/8 | 6N/16 |
| 7 | 0 | N/4 | 2N/8 | 7N/16 |

$N_{i=16}$

TABLE VII

| stage | Butterfly | | | | |
|---|---|---|---|---|---|
| | 0 | 1 | 2 | 3 | 4 |
| 0 | 0 | 0 | 0 | 0 | 0 |
| 1 | 0 | 0 | 0 | 0 | N/32 |
| 2 | 0 | 0 | 0 | N/16 | 2N/32 |
| 3 | 0 | 0 | 0 | N/16 | 3N/32 |
| 4 | 0 | 0 | N/8 | 2N/16 | 4N/32 |
| 5 | 0 | 0 | N/8 | 2N/16 | 5N/32 |
| 6 | 0 | 0 | N/8 | 3N/16 | 6N/32 |
| 7 | 0 | 0 | N/8 | 3N/16 | 7N/32 |
| 8 | 0 | N/4 | 2N/8 | 4N/16 | 8N/32 |
| 9 | 0 | N/4 | 2N/8 | 4N/16 | 9N/32 |
| 10 | 0 | N/4 | 2N/8 | 5N/16 | 10N/32 |
| 11 | 0 | N/4 | 2N/8 | 5N/16 | 11N/32 |
| 12 | 0 | N/4 | 3N/8 | 6N/16 | 12N/32 |
| 13 | 0 | N/4 | 3N/8 | 6N/16 | 13N/32 |
| 14 | 0 | N/4 | 3N/8 | 7N/16 | 14N/32 |
| 15 | 0 | N/4 | 3N/8 | 7N/16 | 15N/32 |

$N_i = 32$

TABLE VIII

| COUNTER STAGE | MASK | | | |
|---|---|---|---|---|
| | 0 / 000 | 1 / 100 | 2 / 110 | 3 / 111 |
| 000 | 000 | 000 | 000 | 000 |
| 001 | 000 | 000 | 000 | 001 |
| 010 | 000 | 000 | 010 | 010 |
| 011 | 000 | 000 | 010 | 011 |
| 100 | 000 | 100 | 100 | 100 |
| 101 | 000 | 100 | 100 | 101 |
| 110 | 000 | 100 | 110 | 110 |
| 111 | 000 | 100 | 110 | 111 |

$N_i = 16$

If memory 126 only contains the coefficients of the interval 0, $\pi/4$ a decoder, not shown in FIG. 6, is inserted before memory 126, this decoder ensures the addressing of memory 126 as well as the addressing of the device 190 allowing the change of sign in accordance with the trigonometric formulae for passing from the interval [0, $\pi/4$] to the interval [0, $\pi$].

In FIG. 7 can be seen the variation in time of the address sequences. Curve 201 shows the variations in time of the address sequences $G_i$ for transfer between the external memory and the internal memory. Curve 202 shows the evolution in time of the address sequences of the group the processing of which is carried out. Curve 203 shows the evolution in time of the address sequences $G_i$ of the internal memory—external memory transfers. Curve 204 shows the address sequences which the processor 129 of FIG. 6 must calculate. This then in the example where we start with $G_i$ and where k=1 the sequence $G_i$, $G_i+2$, $G_i+1$, $G_i+3$, $G_i+2$, $G_i+4$, etc . . . k is equal to the number of terms of the partial succession multiplied by the number of terms of the group of the step in progress. One example of implantation for calculating a group of eight terms comprising successively three steps of four butterflies of FIG. 1 is given in Table IV. The succession of the first step is sequential, at the beginning of each of the following steps a leftward circular shift of $Log_2$ is effected (size of the group).

In FIG. 8, can be seen the evolution in time of the functions executed by memories 130 and 131. The functions executed by memory 130 bear the reference 87 whereas those executed by memory 131 bear the reference 188. The length T1 corresponds to the calculating time, the length T2 corresponds to the pipe line delay of the processor. A first function for reading a memory 130 bears in the Figure the reference 175 whereas writing bears the reference 178. Simultaneously, memory 131 finishes writing at 171 and begins the input-output management at 180. In the next cycle the memory 130 ensures exchanges with the external memory at 176, i.e. the inputs and outputs. Simultaneously at 181, memory 131 ensures reading and at 185 writing. In the following cycle the roles are re exchanged and at 177 memory 130 ensures reading and at 179 writing whereas memory 131 ensures the inputs and outputs at 182. The succession of the cycles continuing analogically is not shown in the Figure.

The device of the invention described hereafter checks the correct operation of the circuit calculating the DFT by using Parseval's theorem which is simpler to use than the algorithm for calculating the DFT. In addition, the reliability of the complete system is increased by the independence of the checking calculations with respect to the calculations to be checked.

Parseval's theroem indicates that the power of the signal analyzed is equal to the sum of the powers of its harmonics. For the DFT Parseval's theorem is expressed by the formula:

$$\sum_{n=0}^{N-1} |x(n)|^2 = \frac{1}{N} \sum_{k=0}^{N-1} |X(k)|^2 \quad (1)$$

x(n) being the nth element of the input sequence of the DFT processor and X(k) being the kth element calculated by the DFT processor.

The calculation of a DFT of N points by the operator 500 of FIG. 6 requires running through N/2 log$_2$N DFT butterflies of FIG. 1, which corresponds to 2N log$_2$N multiplications and 3n log$_2$N additions. On the other hand, the calculation for checking the result using Parseval's theorem requires 2N multiplications and 2(N−1) additions. Thus the calculation of the DFT requires log$_2$N times a number of multiplications and $$\frac{3N \log_2 N}{2(N-1)}$$

times the number of additions required for checking this calculation.

In one example, operator 500 of FIG. 6 effects the DFTs over N points, N varying between 8 and 8000. Thus, in the least favorable case the device for checking the DFT requires three times less multiplications and 5.4 times less additions.

In FIG. 9 can be seen a first embodiment of an operator 214 for checking the result of a DFT operator.

Operator 214 comprises a processor 205 calculating the absolute value, a multiplier 206, an accumulator 208, an assembly of registers 207, a substractor 209, a processor 210 calculating the absolute value, a comparator 211, a memory 212, a multiplexer 249 and a divider 242.

Operator 214 is connected to bus 55 and reads alternately the data entering and leaving the operator 500 of FIG. 6. The output of processor 205 is connected to the two inputs of the multiplier 206 which squares the absolute value calculated by processor 205. The squares are summed in accumulator 208 which then calculates a sum of absolute value squares corresponding for example to the second term of Parseval's equality. Accumulator 208 is connected to multiplexer 249. Multiplexer 249 transmits the value from accumulator 208 alternately to divider 242 or to register 207.

Divider 242 divides the value received by N. The value N, equal to the number of points over which the DFT is effected, is transmitted to divider 242 over bus 299. Registers 207 delay the signal by a predetermined number of times. For example, if the calculation of the checks effected by operator 214 is three times faster than the calculation of the DFT by operator 500 of FIG. 6, registers 207 comprise three registers connected in series and thus introducing a delay of three clock cycles.

The outputs of registers 207 and divider 242 are applied to the two inputs of subtractor 209. Subtractor 209 calculates the difference between the two terms of the equality (I) of Parseval's theorem. Subtractor 209 is connected to operator 210 which calculates the absolute value of the difference calculated by the subtractor 209.

Operator 210 on the one hand and memory 212 on the other are connected to comparator 211. Memory 212 contains the maximum error value admissible in calculating the DFT.

Advantageously, memory 212 is a random access memory (RAM). The value stored in memory 212 is for example loaded by a bus 215. If the difference between the two terms of Parseval's equality (I) is greater than the tolerance stored in memory 211, comparator 211 trips an alarm device 213 over a line 251.

Of course the processors of FIG. 9 are given solely by way of non limitative examples. For example, processors 205 and 210 may be absent in a parallel connection if the sign is not kept. Similarly, divider 242 effecting a division by a power of 2 may be replaced by adequate wiring of operator 214.

In FIG. 10 can be seen a second embodiment of operator 214 for checking the result of calculating the DFT. The operator 214 of FIG. 10 uses the logarithmic calculation described in "Logarithmic addition for digital signal processing applications" M. M. Etzel-Bell Lab. Symposium on circuit and system May 1983.

This article states that the logarithm of a sum is little different from the sum of a first logarithm forming the main term and a second forming a corrective term.

Thus, if from N values: $a_0, a_1, \ldots a_i, \ldots a_{N-1}$, it is desired to calculate $$\log \left( \sum_{i=0}^{N+1} a_i \right)$$

the following formula can be used:

$$\log \left[ \sum_{i=0}^{N-1} (a_i) \right] = \sum_{j=1}^{N} \log A_j + \sum_{k=0}^{N-1} \log (1 \pm 2^{(-1)(X_k - X'_k)(X_k - X'_k)})$$

with:

$$A_j = \text{Max} \left( a_j, \ldots \sum_{i=0}^{j-1} a_i \right)$$

$$X'_k = \log \left( \sum_{i=0}^{k-1} a_k \right)$$

$$X_k = \log (a_k)$$

Operator 214 is connected to bus 55 through two registers 217 and 220. Registers 217 and 220 are connected to two inputs of a multiplexer 218 delivering alternately onto a bus 219 a value of one of said registers. The use of two registers 217 and 220 allows the capacity of bus 219 to be matched to that for example two times greater of bus 55. For example bus 55 is a 50 bit bus whereas bus 219 is a 24 bit bus. Bus 219 is divided into two buses 243 and 242. Bus 242 supplies the mantissa to processor 221 whereas bus 243 supplies the exponent of the numbers present on bus 219 to the concatenation processor 224.

Processor 221 calculates the absolute value. Processor 221 is connected to register 222. Register 222, like the register 225, 227, 233, 234, 207, ensures resynchronization with the clock and introduces the delays required for synchronizing the calculations.

Register 222 is connected to a table 223 which associates twice its logarithm with a value. Table 223 is for example a ROM in which at the useful addresses are stored the numbers equal to: $2 \times \log_2$ (address). Table 223 on the one hand and bus 243 on the other are connected to a concatenation circuit 224. Circuit 224 combines into a single number the two numbers present at the output of table 223 and on bus 243. The exponent present on bus 243 becomes most significant bits (MSB) and the logarithm from table 223 becomes least significant bits (LSB). Thus at the output of circuit 224 we find the logarithm with base 2 $(x \times e + \log_2 m)$ of the number present at the output of the multiplexer 218 $(a = 2^e \cdot m)$ in the form of a mantissa and an exponent.

The output of circuit 224 is connected to register 225, to a multiplexer 226 and to a multiplexer 232. Multiplexer 226 is connected to a computer 228 through the register 227. Register 225 is connected to the computer 228. Computer 228 calculates the difference $$d = a_j - \log_2 \sum_{i=0}^{i} a_i.$$

Computer 228 is connected to processor 229 which calculates the absolute value. Processor 229 is connected to a table 230 which comprises the corrective terms $z = \log_2 (1 \pm 2^{-d})$. Table 230 is connected to a multiplexer 231. Multiplexer 231 is connected to an input of an accumulator 235 through the register 234. Multiplexer 232, connected to the output of circuit 224, is further connected to the other input of accumulator 235. Accumulator 235 calculates the sum of the squares corresponding to the terms of Parsival's equation (I).

The accumulator is connected on the one hand to a comparator 238 and on the other to the multiplexers 232, 226 and through three registers 207 to multiplexers 231. The delay provided by register 207 allows passing over from the first to the second term of Parseval's equation (I) i.e. from the data to the results for calculating the DFT. In a variant of the device of the invention, registers 207 are connected to multiplexer 231 through a $-1/N$ divider 242 equivalent to a subtractor in logarithmic calculation. The value of N is loaded over bus 299. In the other embodiment of the device of the invention, division by N and the sign change are accomplished by adequate wiring.

Calculator 228 is capable of controlling multiplexer 232 over line 241. If the value of $$d = \log_2 a_i - \log \sum_{i=0}^{i} a_i$$

is greater than 0, multiplexer 232 transmits the partial sum calculated by the accumulator 235. If not, multiplexer 232 transmits the value of the sample present at the output of circuit 224.

Multiplexers 226 and 231 receive the control signals respectively 262 and 240 depending on the advance of the calculations made by the control unit 127 of FIG. 6 or on the connections not shown in said Figure.

Accumulator 235 directly works out the difference between the two terms of Parseval's equation (I). Comparator 238 receives on the one hand this difference and on the other the value of the maximum admissible tolerance stored for example in memory 212. In a first variant this value of the tolerance is frozen. In a second variant this value of the tolerance may be loaded over bus 215.

In the case where the difference between the two terms of Parseval's equation (I) is greater than the value of the maximum admissible tolerance stored in memory 212, comparator 238 trips an alarm device 213.

In a first variant, the device of the invention is in the form of printed circuits. Advantageously, the device of the invention comprises integrated circuits. Advantageously, these integrated circuits are formed with gallium arsenide technology ensuring a high processing speed.

In a second variant of the device of the invention to be constructed in the form of an integrated circuit, this integrated circuit is advantageously formed with gallium arsenide technology.

What is claimed is:

1. An apparatus for checking a discrete fourier transform, comprising:
   means for calculating the two terms of Parseval's equation with one term based on samples and the other term based on Fourier coefficients of the fourier transform;
   subtractor means for subtracting one of said terms from the other of said terms to produce a result; and
   comparator means, connected to said subtractor means to receive said result, for comparing said result with a tolerance and producing an indication when said result is greater than said tolerance.

2. An apparatus as in claim 1 further comprising means for calculating said discrete fourier transform; and
   a data bus transmitting values from said fourier transform calculating device to said calculating.

3. An apparatus as in claim 1 wherein said calculating means includes:
   squaring means for calculating a squared value of each said term;
   summing means for summing said squares of respective terms to produce two summed terms; and
   dividing means for dividing one of said summed terms by a number of squares making up said one sum.

4. The apparatus as in claim 3 wherein said squaring means comprises:
   means for calculating an absolute value of one of said terms of said discrete fourier transform; and
   multiplying means, having two inputs each connected to an output of said absolute value means, for multiplying said inputs to produce a square of said output of said absolute value means.

5. An apparatus as in claim 3 wherein said summing means comprises an accumulator.

6. An apparatus as in claim 1 further comprising alarm means, coupled to said comparator means, for producing an alarm in response to said indication.

7. An apparatus for checking a discrete fourier transform comprising:
   means for calculating two summations based on terms including said fourier transform and values before fourier transforming, including a first summation of:

$$\sum_{n=0}^{N+1} x(n)^2$$

and a second summation of: $\frac{1}{N} \sum_{k=0}^{N-1} X(k)^2$ where X(k) is a fourier transform of x(n);
   subtractor means for subtracting one of said summations from the other of said summations to produce a result; and
   comparator means connected to said subtractor means to receive said result for comparing said result with a tolerance and producing an indication when said result is greater than said tolerance.

8. An apparatus as in claim 7 wherein said calculating means includes means for calculating an absolute value of said terms; and
   a multiplier connected to an output of said absolute value calculating means for squaring said absolute value.

9. An apparatus as in claim 8 wherein said calculating means comprises dividing means for dividing an output of said multiplier by a predetermined value.

* * * * *